United States Patent
Drummond

(10) Patent No.: US 6,593,400 B1
(45) Date of Patent: Jul. 15, 2003

(54) TALC ANTIBLOCK COMPOSITIONS AND METHOD OF PREPARATION

(75) Inventor: Donald Kendall Drummond, Quakertown, PA (US)

(73) Assignee: Minerals Technologies Inc.

( * ) Notice: Subject to any disclaimer, the term of this patent is extended or adjusted under 35 U.S.C. 154(b) by 0 days.

(21) Appl. No.: 09/343,825

(22) Filed: Jun. 30, 1999

(51) Int. Cl.⁷ ................................................ C08K 9/00
(52) U.S. Cl. ...................... 523/205; 523/209; 523/212; 523/213; 523/216; 524/425; 524/445; 524/447; 524/451; 524/492; 106/465
(58) Field of Search ................................ 524/425, 445, 524/447, 451, 492; 523/205, 209, 212, 213, 216; 106/465

(56) References Cited

U.S. PATENT DOCUMENTS

| | | | |
|---|---|---|---|
| 5,229,094 A | | 7/1993 | Clauss et al. |
| 5,283,267 A | * | 2/1994 | Nishio et al. ................ 523/216 |
| 5,401,482 A | | 3/1995 | Clauss et al. |
| 5,827,906 A | * | 10/1998 | Metzemacher et al. ...... 523/205 |
| 5,852,108 A | * | 12/1998 | Yamanaka et al. .......... 524/790 |

* cited by examiner

*Primary Examiner*—Edward J. Cain
(74) *Attorney, Agent, or Firm*—Marvin J. Powell; Michael J. Herman

(57) ABSTRACT

The present invention relates to a product, a process for its preparation and the use of such in plastic film production. More specifically, the present invention relates to an antiblock talc, a process for the preparation of such and its use as an additive in the production of polyolefin film.

Polyolefin films produced according to the process of the present invention are useful in a broad range of packaging and film covering applications.

30 Claims, No Drawings

TALC ANTIBLOCK COMPOSITIONS AND METHOD OF PREPARATION

FIELD OF THE INVENTION

The present invention relates to a product, a process for its preparation and the use of such in plastic film production. More specifically, the present invention relates to an anti-block talc, a process for the preparation of such and its use as an additive in the production of polyolefin film.

Polyolefin films produced according to the process of the present invention are useful in a broad range of packaging and film covering applications.

BACKGROUND OF THE INVENTION

Polyolefin films are used extensively for packaging and in film covering applications. The use of polyolefin films continues to increase as new market opportunities become available in areas where paper was traditionally used. The versatility of the film provides potentially infinite growth prospects for the product in the future. However, there is an inherent short coming in the use of plastic films that may retard its market acceptance and growth, it sticks. When plastic film is produced or used in various applications, there is a tendency for contacting layers of the film to stick together or "block", making separation of the film, opening of bags made from the film, or finding the end of the film on plastic rolls difficult. The present invention relates to polyolefin resin compositions that are specifically designed to have satisfactory antiblocking capability.

Antiblock agents are materials that are added to polyolefin resins to roughen their surface and thereby prevent layers of the plastic film from sticking, hence the term, "antiblocking agent" is applied to such materials. Although, inorganic minerals, such as, for example, diatomaceous earth, synthetic silica and talc are known to reduce blocking when added to polyolefin film resin compositions, each has both advantages and critical disadvantages.

One comparative advantage of diatomaceous earth is that it is known to be a moderately effective antiblocking agent, when used as an antiblocking agent. However, it is also known that diatomaceous earth adversely affects the film's physical properties, such as film clarity, film haze, and is very abrasive and moderately expensive and may pose a serious health threat. Synthetic silicates are known to be effective as an antiblock, however a significant disadvantage of silica is that it is very expensive. Talc, on the other hand, has found increasing use as an effective antiblock agent over diatomaceous earth and synthetic silica because of a significant cost advantage over both. However, one major disadvantage when talc is added to polyolefin film resins, is that it aggressively adsorbs other film additives, such as antioxidants, slip agents and processing aid. The absence, or reduced level of these additives in polyolefin resin compositions during production, routinely cause processing problems and raise serious film quality concerns.

For example, antioxidants are added to improve film stability, slip agents are present in the resin to improve film converting, while processing aids are employed to improve film quality, and to provide lubrication during film extrusion by eliminating melt fracture. Melt fracture is a measure of film surface uniformity, appearance and strength. Of the three additives mentioned here, processing aids are most adversely affected by the presence of antiblock agents. Although it is well known that all antiblock agents adsorb processing aids, talc antiblock agents adsorb greater levels of processing aids than either diatomaceous earth or synthetic silica antiblocks. Consequently, when resin compositions are produced having additives that include antiblock talc, it is necessary to increase the dosage of processing aids. The increased dosage adversely effects the over all production economics of the plastic film.

Therefore, what is needed is a new generation of talc antiblock agents that adsorb less process aids than either synthetic silica or diatomaceous earth.

RELATED ART

U.S. Pat. No. 5,401,482, discloses a method for the manufacture of a talc substance consisting of particles having a sheet structure, each particle having an internal crystalline structure and at least one hydrophilic surface, the method comprising heating talc particles to a temperature below 900 degrees Centigrade under conditions such as to avoid conversion of the talc into enstatite and in order to effect a surface modification consisting of substituting inert siloxane groups by active silanols.

U.S. Pat. No. 5,229,094 discloses a talc substance consisting of particles having a sheet structure, each particle comprising internal hydrophobic sheets, having the crystalline structure of talc within each unit and bonded together by cohesion forces typical of talc (Van der Waals forces), the talc substance being characterized in that each particle has at least one hydrophilic surface sheet.

SUMMARY OF THE INVENTION

A product and a method for producing an antiblock agent comprising surface treating an inorganic mineral with a functionalized siloxane polymer or a polyether polymer or functionalized polyether polymer or carbon based polymer. When inorganic minerals are coated with a functionalized siloxane polymer or a polyether polymer or a functionalized polyether polymer or carbon based polymer and subsequently used as an additive in the production of polyolefin film, the adsorption of other resin additives is substantially reduced.

Polyolefin films produced according to the process of the present invention are useful in a broad range of packaging and film covering applications.

DETAIL DESCRIPTION OF THE INVENTION

In one aspect the present invention embodies surface treating talc with certain types of silanes or siloxane polymers. The treated talc inhibits the adsorption of plastic film additives onto the talc. Surface treating means coating, partially coating, or using an effective amount to inhibit the adsorption of other additives. The invention embodies of coating any talc material with a functionalized polydialkyl, preferably polydimethylsiloxane, having the structural formula:

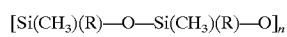
$$[Si(CH_3)(R)-O-Si(CH_3)(R)-O]_n$$

where n is the number of repeating units (molecular weight), $CH_3$ is a methyl group, Si is silicon, O is oxygen, and R is a functionalized alkyl group. The alkyl group may, without limitation, be functionalized with carboxylate, amine, amide, thiol, sulfate, phosphate, and the like.

Siloxane polymers that are useful in the present invention may be selected from the group consisting of finctionalized alkyl polydimethylsiloxane (carboxylate, amine, amide, thiol, sulfate, phosphate) wherein carboxylate is preferred, Bis-(12-hydroxystearate) terminated polydimethylsiloxane (Aldrich Chemical Co.—1001 West Saint Paul Avenue, Milwaukee, Wis. 53233), and Poly(Dimethylsiloxane)-Graft-Polyacrylates (Aldrich). There is no limitation on the method used to produce the siloxane polymers. The siloxane polymers of the present invention may be manufactured by ionic polymerization or radical polymerization and the like, or any other process known to produce siloxane polymers.

The molecular weight range of the siloxane polymer is from about 1000 to about 1,000,000 atomic mass units (a.m.u.), preferably ranges from about 1000 to about 100,000 a.m.u. The molecular weight can be determined by gel permeation chromatography (GPC).

Silanes that are useful in the present invention have the structural formula $SiR_4$, where Si is silicon, R can be any group capable of forming a covalent bond with silicon (e.g., an alkyl group, an alkoxy group, a functionalized alkyl group, and a functionalized alkoxy group, and any combination thereof). The following silanes are useful in the present invention: Octyltriethoxysilane (OSi Silquest® A-137 silane), Triamino functional silane (OSi Silquest® A-1130 silane), Bis-(gamma-trmethoxysilylpropyl) amine (OSi Silquest® A-1170 silane), all of which are commercially available from OSi.

In another aspect, the present invention consists of coating talc with polyethers and functionalized polyethers to reduce film additive adsorption onto the talc. The general structural formula is:

where n is the number of repeating units (molecular weight), x is zero or an integer, R is an alkyl group, O is oxygen, C is carbon, H is hydrogen, and $R_1$ is a functional group which may be, without limitation, an alkyl carboxylate, an alkyl amine, an alkyl amide, analkyl thiol, an alkyl sulfate, an alkyl sulfonate, an alkyl phosphate or an alkyl phosphonate and the like.

Polyethers and functionalized polyethers that are useful for the surface treatment of talc may be selected from the group consisting of poly(ethylene glycol), poly (ethylene glycol) Bis-(carboxymethyl) ether, poly (ethylene glycol) dimethyl ether, poly (ethylene glycol-400) distearate, and the like, and functionalized polyethers (alkyl carboxylate, alkyl amine, alkyl amride, alkyl sulfate, alkyl thiol, alkyl sulfonate, alkyl phosphate, alkyl phosphonate) wherein alkyl carboxylate functionality is preferred. There is no limitation on the method used to produce the polyethers and functionalized polyether polymers. The polyethers and functionalized polyethers of the present invention may be manufactured by ionic polymerization or radical polymerization and the like, or by any other process known to produce polyethers and functionalized polyethers.

The molecular weight range of the polyethers and functionalized polyethers is from about 1000 to about 10,000,000 a.m.u., with a preferred range of from about 10,000 to about 1,000,000 a.m.u. The molecular weight can be determined by GPC.

In a further aspect the present invention pertains to the use of carbon based polymer coatings for surface treating the talc in order to lower the level of additive adsorption. Also included in the definition of carbon based polymers are maleic acid/olefin co-polymers having the general formula:

where n denotes molecular weight and x and y represent the ratio of each monomeric unit in the polymer. Carbon based polymers that are useful for the surface treatment of talc may be selected from the group consisting of functionalized polyolefins: maleic acid/olefin copolymer, maleic acid/styrene copolymer, wherein maleic acid/styrene copolymer is preferred. Also included in the carbon-based polymers group are mineral oils of any boiling point and paraffin waxes of any melting point. The x/y ratio can range from about 100:1 to about 1:100, wherein the preferred range is from about 10:1 to about 1:10. C is carbon, O is oxygen, H is hydrogen and R is a functional group. R may be any group that can form a bond with carbon. This includes, without limitation, alkyl carboxylates, alkyl amines, alkyl amides, alkyl thiols, alkyl sulfates, alkyl sulfonates, alkyl phosphates, and alkyl phosphonates and the like.

The molecular weight of the carbon based polymer may range from about 100 to about 10,000,000 a.m.u., with a preferred range of from about 200 to about 2,000,000 a.m.u.

Any inorganic mineral, such as, talc, calcium carbonate, precipitated calcium carbonate, clay or silica, that is receptive to surface treatment may be coated with the polymers described herein. However, talc is the preferred inorganic mineral. Talcs that are particularly useful are those that are receptive to both surface treatment and that are capable of subsequent use in polyolefin film production. An exemplary, but nonlimiting talc, would typically have an empirical formula of $Mg_3Si_4O_{10}(OH)_2$, and a specific gravity of from about 2.6 to about 2.8. The preferred talc, without other limitations, could have an average particle size of from about 0.1 microns to about 10 microns, wherein the preferred average particle size is from about 0.5 microns to about 5 microns. The talc may be coated with from about 0.01 weight percent to about 10 percent of the polymers described herein, wherein the preferred treatment level for coating is from about 0.25 weight percent to 2 weight percent, based on the weight of the polymer.

All of the polymer coatings described herein may be applied to talc by any convenient dry powder mixing operation. The temperature at which the coating is applied to the talc, ranges from about 0 zero degrees Centigrade (C) to about 500 degrees C., preferably from about 30 degrees C. to about 200 degrees C., and more preferably, from about 60 degrees C. to about 80 degrees C. The application temperature should be adjusted to higher levels if the specific coating requires melting. Once the talc is coated, an antiblock talc is produced that may be used, by those skilled in the art, just as any other commercially available antiblock. For example, but without limitations, the coated antiblock talc may be added to the film extruder or added as an already compounded masterbatch to the extruder. A compounded masterbatch means the resin and the antiblock are pre-mixed in a compounder before being added to the film extruder.

Polyolefins considered suitable for the present invention may be any polyolefin, which can be clear, crystalline, and capable of forming a self-supported film. Non-limiting examples include crystalline homopolymers of α-olefin with carbon numbers ranging from 2 to 12 or a blend of two or more crystalline copolymers or ethylene-vinylacetate copolymers with other resins. Also, the polyolefin resin can be a high-density polyethylene, low density polyethylene, linear low-density polyethylene, polypropylene, ethylene-propylene copolymers, poly-1-butene, ethylene-vinyl acetate copolymers, etc., and low and medium-density polyethylenes. Additional examples are represented by random or block copolymers of polyethylene, polypropylene poly-r-methylpentene-1, and ethylene-propylene, and ethylene-propylene-hexane copolymers. Among them, copolymers of ethylene and propylene and those containing 1 or 2 selected from butene-1, hexane-1, 4-methylpentene-1, and octene-1 (the so-called LLDPE) are particularly suitable.

The method of producing polyolefin resin used in the present invention is not limited. For example, it can be manufactured by ionic polymerization or radical polymerization. Examples of polyolefin resins obtained by ionic polymerization include homopolymers such as polyethylene, polypropylene, polybutene-2, and poly-4-methylpentene and ethylene copolymers obtained by copolymerizing ethylene and α-olefin, α-olefins having from 3 to 18 carbon atoms such as propylene, butene-1,4-methylpentene-1, hexene-1, octene-1, decene-1, and octadecene-1 are used as α-olefins. These α-olefins can be used individually or as two or more types. Other examples include propylene copolymers such as copolymers of propylene and butene-1. Examples of polyolefin resins obtained by radical polymerization include ethylene alone or ethylene copolymers obtained by copolymerizing ethylene and radical polymerizable monomers. Examples of radical polymerizable monomers include unsaturated carboxylic acids such as acrylic acid, methacrylic acid and maleic acid esters and acid anhydrides thereof, and vinyl esters such as vinyl acetate. Concrete examples of esters of unsaturated carboxylic acids include ethyl acrylate, methyl methacrylate and glycidyl methacrylate. These radical polymerizable monomers can be used individually or as two or more types.

A typical embodiment of the present invention could include:

| From about | To about | |
|---|---|---|
| 0.1% | 1.0% | talc antiblock |
| 0.02% | 0.5% | process aid |
| 0.05% | 0.25% | slip agent |
| 0.01% | 0.5% | antioxidant |
| 0.01% | 0.25% | scavenger |
| 0.1% | 5.0% | siloxane, silane, polyether, carbon based polymer |
| 99.7% | 92.5% | polyolefin resin |

A typical preferred embodiment of the present invention includes:

| | |
|---|---|
| 0.5% | talc antiblock |
| 0.15% | process aid |
| 0.12% | slip agent |
| 0.03% | antioxidant |
| 0.05% | scavenger |
| 0.10% | antioxidant |
| 2.50% | siloxane, silane, polyether, carbon based polymer |
| 96.55% | polyolefin resin |

All percentages are based on total weight percent.

Test Methods and Procedures

Equipment

1. Extruders. The following extruders were used to measure the effect of antiblocks on process aid (PA) performance.

a. Brabender Single Screw Tape Die Extruder
 b. ZSK co-rotating low intensity twin screw extruder
 c. Lestritz low intensity counter-rotating twin screw extruder
 d. Welex Extruder 2. Henshal Mixer. Used for mixing the siloxane, or silane, or polyether, or carbon based polymer and antiblock compounds.

3. Killion Blown Film Line. This is a $1^{1/4}$ inch extruder with a L/D ratio of 30:1 and $2^{1/2}$ inch die with a 12 mm die gap. The temperature profile of the extruder and the blown film line were 177° C., 93° C., 193° C., 204° C., 204° C., 204° C., 204° C., 204° C., 204° C., and 204° C. with a melt temperature of 200–208° C. Output was about 9 lbs/hr. with a sheer rate of 500 $sec^{-1}$. Die pressure and melt fracture reduction were monitored every 15 minutes for two hours.

Definition of Terms

Extrusion—fundamental processing operation in which a material is forced through a metal forming die, followed by cooling or chemical hardening (see Hawley's Condensed Chemical Dictionary, $12^{th}$ Edition 1993, page 505).

Die—a device having a specific shape or design in which it imparts to plastic by passing the material through it (estrusion). Die extruders are used to measure the effect of anti-blocks on process aid (PA) performance.

Tape Die Extrusion—extrusion procedure for measuring process aid demand based on the amount of process aid required to reduce die pressure and eliminate melt fracture.

Antiblock—materials that roughen the surface of plastic films to reduce their tendency to stick together. These materials may include synthetic silica, diatomaceous earth (DE), and talc.

Clarity Antiblock—a type of antiblock that is added when compounding chemicals, to reduce opacity and to improve the clarity of the polymer film.

Process Aid (PA)—provides lubrication or slip at the die during film extrusion which improves film quality by elimination of melt fracture. Process aids are evaluated on pressure reduction (less PA absorbed) and elimination of melt fracture (percent melt fracture).

Die Pressure—Pressure at the die. Die pressure reduction is how well the process aid is performing, meaning that the process aid is not absorbed by the talc and hence, is available to reduce die pressure.

Melt Fracture—a measure of film surface uniformity. The objective is complete elimination of melt fracture. Melt fracture is monitored as a function of time at a given PA dosage and measured in a rate conditioning test.

Rate of Conditioning—Technique used by film manufacturers to determine process aid (PA) performance and to determine the effect of a given antiblock on PA effectiveness. This is done using tape die extrusion and monitoring die pressure and percent melt fracture over a period of time.

ABT-G—an ABT 2500® talc coated with an amine functionalized siloxane (Genese Polymers, GP-4).

Functional Groups—The arrangements of atoms and groups of atoms that occur repeatedly in an organic substance.

Blown Film Test—Type of extrusion that after the polymer compounded is formed to its desired thickness by air being blown through a cylindrical die.

Antioxidant—An organic compound added to plastics to retard oxidation, deterioration, rancidity, and gum formation (see Hawley's Condensed Chemical Dictionary, $12^{th}$ Edition 1993, page 90).

Feldspar—General name for a group of sodium, potassium, calcium, and barium aluminum silicates (see Hawley's Condensed Chemical Dictionary, $12^{th}$ Edition 1993, page 509).

Diatomaceous earth (DE)—Soft, bulky, solid material (88% silica) composed of small prehistoric aquatic plants related to algea (diatoms). Absorbs 1.5 to 4 times its weight of water, also has high oil absorption capacity (see Hawley's Condensed Chemical Dictionary, $12^{th}$ Edition 1993, page 365).

Paraffin (alkane)—a class of aliphatic hyrdocarbons characterized by a straight or branched carbon chain ($C_nH_{2n+2}$) (see Hawley's Condensed Chemical Dictionary, $12^{th}$ Edition 1993, page 871).

EXAMPLES

The following examples are intended to be illustrative of the present invention and are not proffered, in any manner whatsoever, to limit the scope of the present invention which is more specifically defined by the appended claims.

Section I. Investigation of Talc Coatings to Reduce Process Aid (PA) Demand of Anti-blocks In Example 1 and Example 2, the antiblock is compounded with a linear low density polyethylene (PE) in a ZSK co-rotating low intensity twin screw extruder at 30 percent loading levels. In a separate batch process the process aid is compounded with the PE at a 10 percent loading level. Process aid dosage was varied from zero parts per million to 1400 ppm in 200 ppm increments. The samples were extruded at a constant rate (20 g/min) for one hour, at each increment, with die pressure and tape melt fracture being monitored throughout. VITON® Free-Flow SAX 7431 (Genese Polymers) process aid was used in Example 1 and replaced with Dynamar™ FX-5920 (Dynamar Products—3M Center, St. Paul, Minn. 55144) process aid in Example 2.

The effect of anti-block type on PA performance is determined using a ¾" Brabender single screw extruder fitted with a 1"×0.020" ribbon tape die. The extruder was run with a sheer rate of 400–500sec.$^{-1}$ and with an output of 20 grams per minute. PA performance was monitored by die pressure and by percent melt fracture of the extruded PE tape over a one-hour time period.

Example 1
Process Aid Demand for Various Antiblocks

ABT® 2500 talc, ABT® 2500 talc treated with an amine functionalized siloxane (ABT-G), B4 (Viton Products—Viton Business Center, P.O. Box 306, Elkton, Md. 21922) clarity antiblock, B4 treated with an amine functionalized siloxane, Celite 238 D.E. (Celite Products—Solon, Ohio), synthetic silica, and MICROBLOC® talc. The treated antiblocks are prepared by dry coating in a Henschal mixer for ten minutes, at 70° C., with a siloxane polymer, at a coating level of one percent by dry weight of talc. The coating consisted of an amine functionalized siloxane (Genese Polymers—GP-4).

In addition to analyzing the three talc samples described above, a clarity antiblock consisting of 50 percent by volume MP 10-52 and 50 percent by volume Feldspar, a GP-4 treated clarity antiblock, ABT 2500® talc, MICROBLOC® talc, diatomaceous earth (Celite Superfloss 238) and synthetic silica (Crosfield 705—Crosfield Products—101 Ingalls Avenue, Joliet, Ill. 60435) were also examined.

TABLE 1

VITON ® FLUOROELASTOMER PROCESS AID DOSAGE

| Anti-Block | Process Aid (parts per million) | Percent Melt Fracture |
| --- | --- | --- |
| ABT ® 2500 talc | 1200 | 40 |
| ABT-G siloxane coated talc | 400 | 10 |
| B4 clarity antiblock | 1000 | 25 |
| B4 siloxane coated | 400 | 15 |
| Celite 238 D.E. | 800 | 40 |
| Synthetic Silica[a] | 600 | 2 |
| MICROBLOC ® talc | 1000 | 20 |

[a]2000 parts per million synthetic silica

Lower process aid dosages were required to reduce melt fracture when the talc and clarity antiblocks were treated with a siloxane coating.

Example 2
Talc and Synthetic Silica as Antiblocks

In this example, the process aid used in Example 1 was replaced Dynamar™ FX-5920 process aid. ABT 2500® talc (uncoated and coated with a siloxane) was compared with a synthetic silica and a commercially available antiblock for process aid demand. Table 2 shows the amount of process aid required to reduce melt fracture.

TABLE 2

DYNAMAR ™FLUOROELASTOMER PROCESS AID DOSAGE

| Anti-Block | Process Aid (parts per million) | Percent Melt Fracture |
| --- | --- | --- |
| ABT ® 2500 talc | 1200 | 50 |
| ABT-G siloxane coated talc | 1000 | 20 |
| Synthetic Silica[a] | 1200 | 80 |
| MICROBLOC ® talc | 1200 | 65 |

[a]2000 parts per million synthetic silica

The siloxane coated talc required lower amounts of process aid to reduce melt fracture than did the other antiblocks.

Section II. Antiblock Coatings and their Effect on Process Aid Performance

In Example 3, melt fracture and die pressure data of ABT® 2500 talc, ABT-G siloxane coated talc, and diatomaceous earth (DE) were compared. In Example 4, commercially available talc antblocks are evaluated for process aid performance and compared with those in Example 3. Example 5 through Example 7, investigate alternative coatings for an improved antiblock.

The antiblocks were compounded with blends containing polyethylene resin, 5,000 ppm antiblock, 1,000 ppm VITON® Free Flow SAX—7431 PA, 1,200 ppm Croda ER erucamide slip agent, 300 ppm Irganox® 1010 antioxidant, 500 ppm J. T. Baker zinc stearate scavenger, and 1,000 ppm Irgafos® 168 antioxidant were compounded on the Lestritz low intensity counter-rotating twin screw extruder. Extruder conditions consisted of temperature zones of 165° C., 175° C., 190° C., 200, and 204° C. A screw speed at 150 rpm with one port and one hopper. The extender screws were 34mm in diameter with a L/D ratio of 22:1.

Example 3
Melt Fracture and Die Pressure Performance of Antiblocks

Die pressure and percent melt fracture were determined for ABT® 2500 talc, ABT-G siloxane coated talc, and DE antiblocks, using tape die extrusions. Percent melt fracture and die pressure data for these antiblocks throughout a one hour tape extrusion are listed below.

TABLE 3

RATE OF CONDITIONING
Benchmark Antiblocks

| Time (min) | ABT® 2500 talc | | ABT-G siloxane coated talc | | Diatomaceous Earth | |
|---|---|---|---|---|---|---|
| | % Melt Fracture | Die Pressure (psi) | % Melt Fracture | Die Pressure (psi) | % Melt Fracture | Die Pressure (psi) |
| 0 | 100 | 3110 | 10 | 3100 | 100 | 3100 |
| 10 | 100 | 3100 | 100 | 3100 | 100 | 3040 |
| 20 | 100 | 3100 | 100 | 3100 | 55 | 2740 |
| 30 | 95 | 3100 | 85 | 2990 | 20 | 2640 |
| 40 | 90 | 3070 | 60 | 2830 | 10 | 2540 |
| 50 | 80 | 2870 | 50 | 2790 | 0 | 2480 |
| 60 | 65 | 2880 | 35 | 2760 | | |

A decrease in melt fracture of 30 percentage points and a die pressure reduction of 120 psi was seen when ABT® 2500 talc was treated with an amine functionalized siloxane (ABT-G).

Example 4
Commercial Talc Antiblocks

In this example, commercially available MICROBLOC® talc, POLYBLOC™ talc, and MICROTUFF® AG 101 talc antiblocks were compared with the antiblocks used in Example 3. Measurements were taken throughout a one hour tape extrusion. Percent melt fracture is found in Table 4 and die pressure data in Table 5.

TABLE 4

RATE OF CONDITIONING/COMMERCIAL TALCS
Percent Melt Fracture

| Time (min) | ABT® 2500 talc | ABT-G siloxane coated talc | D.E. | MICRO-BLOC® Talc | POLY-BLOC™ Talc | MICRO-TUFF® AG 101 Talc |
|---|---|---|---|---|---|---|
| 0 | 100 | 100 | 100 | 100 | 100 | 100 |
| 10 | 100 | 100 | 100 | 100 | 100 | 100 |
| 20 | 100 | 100 | 55 | 96 | 95 | 100 |
| 30 | 95 | 85 | 20 | 95 | 85 | 85 |
| 40 | 90 | 60 | 10 | 75 | 75 | 65 |
| 50 | 80 | 50 | 0 | 50 | 55 | 55 |
| 60 | 65 | 35 | | 40 | 40 | 45 |

MICROBLOC®, POLYBLOC™, and MICROTUFF® are trademarks of and are commercially available through Minerals Technologies Inc.-The Chrysler Building, 405 Lexington Avenue, New York, New York 10174.

The siloxane coated talc (ABT-G) had a lower percentage melt fracture than the commercially available talc antiblocks.

TABLE 5

RATE OF CONDITIONING/COMMERCIAL TALCS
Die Pressure (psi)

| Time (min) | ABT® 2500 talc | ABT-G siloxane coated talc | D.E. | MICRO-BLOC® Talc | POLY-BLOC™ Talc | MICRO-TUFF® AG 101 Talc |
|---|---|---|---|---|---|---|
| 0 | 3110 | 3100 | 3100 | 3110 | 3140 | 3120 |

TABLE 5-continued

RATE OF CONDITIONING/COMMERCIAL TALCS
Die Pressure (psi)

| Time (min) | ABT® 2500 talc | ABT-G siloxane coated talc | D.E. | MICRO-BLOC® Talc | POLY-BLOC™ Talc | MICRO-TUFF® AG 101 Talc |
|---|---|---|---|---|---|---|
| 10 | 3100 | 3100 | 3040 | 3110 | 3130 | 3120 |
| 20 | 3100 | 3100 | 2740 | 3100 | 3130 | 3120 |
| 30 | 3100 | 2990 | 2640 | 3090 | 3030 | 3020 |
| 40 | 3070 | 2830 | 2540 | 2930 | 2950 | 2950 |
| 50 | 2970 | 2790 | 2480 | 2860 | 2840 | 2850 |
| 60 | 2880 | 2760 | | 2790 | 2780 | 2790 |

The siloxane coated talc (ABT-G) had lower die pressure than the commercially available talc antiblocks.

Example 5
Siloxane Coated Talc Antiblocks

ABT 2500® talc in addition to being coated with the amine functional silicone fluid (ABT-G)/(Genese Polymers, GP-4), was coated with an aminomodified propyltrimethoxy silane (OSI, Silquest® A-1130 silane), and a bis-(trimethoxysilylpropyl) amine (OSI, Silquest® A-1170 silane). Tape die extrusions were used to determine melt fracture and die pressure.

Tape die extrusion results are listed in Table 6 and Table 7.

TABLE 6

RATE OF CONDITIONING
Percent Melt Fracture

| Time (min) | ABT® 2500 talc | ABT-G coated talc | D.E. | SILQUEST® A-1130 coated talc | SILQUEST® A-1170 coated talc | Poly-acrylate coated talc |
|---|---|---|---|---|---|---|
| 0 | 100 | 100 | 100 | 100 | 100 | 100 |
| 10 | 100 | 100 | 100 | 100 | 100 | 100 |
| 20 | 100 | 100 | 55 | 98 | 95 | 95 |
| 30 | 95 | 85 | 20 | 95 | 85 | 90 |
| 40 | 90 | 60 | 10 | 85 | 60 | 65 |
| 50 | 80 | 50 | 0 | 75 | 45 | 45 |
| 60 | 65 | 35 | | 65 | 30 | 35 |

SILQUEST® A-1170 and the polyacrylate coated products show lower melt fracture than the uncoated talc and performs similarly to siloxane coated (ABT-G) talc.

TABLE 7

RATE OF CONDITIONING
Die Pressure (psi)

| Time (min) | ABT® 2500 | ABT-G | D.E. | SILQUEST® A-1130 | SILQUEST® A-1170 | Poly-acrylate |
|---|---|---|---|---|---|---|
| 0 | 3110 | 3100 | 3100 | 3110 | 3140 | 3110 |
| 10 | 3100 | 3100 | 3040 | 3110 | 3130 | 3100 |
| 20 | 3100 | 3100 | 2740 | 3110 | 3120 | 3100 |
| 30 | 3100 | 2990 | 2640 | 3080 | 2980 | 3080 |
| 40 | 3070 | 2830 | 2540 | 3060 | 2800 | 2940 |
| 50 | 2970 | 2790 | 2480 | 2970 | 2770 | 2790 |
| 60 | 2880 | 2760 | | 2870 | 2710 | 2750 |

ABT® 2500 talc coated with SILQUEST® A-1170 and the polyacrylate show reduced die pressures when compared with the uncoated ABT® 2500 talc.

Example 6
Polyether Coated Talc Antiblocks

This example shows the effect of polyethers as coatings for low PA talc antiblocks. ABT® 2500 talc was coated with polyethylene glycol (PEG), a PEG product functionalized with polar carboxylate groups, and a PEG product functionalized with less polar stearate groups. Melt fracture data is found in Table 8 and die pressure results are found in Table 9.

TABLE 8

RATE OF CONDITIONING/POLYETHER COATINGS
Percent Melt Fracture

| Time (min) | ABT® 2500 talc | ABT-G siloxane coated talc | D.E. | Polyethylene Glycol (PEG) 200 coated talc | PEG Carboxy coated talc | PEG Distearate coated talc |
|---|---|---|---|---|---|---|
| 0 | 100 | 100 | 100 | 100 | 100 | 100 |
| 10 | 100 | 100 | 100 | 100 | 100 | 100 |
| 20 | 100 | 100 | 55 | 100 | 100 | 95 |
| 30 | 95 | 85 | 20 | 95 | 95 | 70 |
| 40 | 90 | 60 | 10 | 75 | 75 | 40 |
| 50 | 80 | 50 | 0 | 55 | 55 | 35 |
| 60 | 65 | 35 | | 45 | 30 | 25 |

All three ether coated talcs had lower melt fractures than the uncoated ABT® 2500 talc.

TABLE 9

RATE OF CONDITIONING/POLYETHER COATING
Die Pressure (psi)

| Time (min) | ABT® 2500 talc | ABT-G siloxane coated talc | D.E. | Polyethylene Glycol (PEG) 200 coated talc | PEG Carboxy coated talc | PEG Distearate |
|---|---|---|---|---|---|---|
| 0 | 3110 | 3100 | 3100 | 3100 | 3120 | 3140 |
| 10 | 3100 | 3100 | 3040 | 3100 | 3110 | 3100 |
| 20 | 3100 | 3100 | 2740 | 3090 | 3080 | 3090 |
| 30 | 3100 | 2990 | 2640 | 3070 | 3030 | 2930 |
| 40 | 3070 | 2830 | 2540 | 2930 | 2840 | 2820 |
| 50 | 2970 | 2790 | 2480 | 2840 | 2770 | 2760 |
| 60 | 2880 | 2760 | | 2750 | 2740 | 2670 |

All three ether coated talcs had lower die pressures than the uncoated talc.

Example 7

Carbon Based Polymer Coated Talc Antiblocks

Functionalized polyolefins and paraffins were examined for melt fracture and die pressure with respect to PA demand. The polyolefins included a maleic acid/olefin copolymer and a maleic acid/styrene copolymer. A low molecular weight paraffin (mineral oil) and a high molecular weight paraffin (paraffin wax) were also evaluated as talc coating. The molecular weight of the paraffin is from about 80 to about 1400 a.m.u., wherein the preferred molecular weight is from about 200 to about 600 a.m.u. Melt fracture results are in Table 10 and die pressure results in Table 11.

TABLE 10

RATE OF CONDITIONING
Percent Melt Fracture

| Time (min) | ABT® 2500 Talc | ABT-G | D.E. | Maleic- co-olefin | Maleic- styrene | Mineral Oil | Paraffin Wax |
|---|---|---|---|---|---|---|---|
| 0 | 100 | 100 | 100 | 100 | 100 | 100 | 100 |
| 10 | 100 | 100 | 100 | 100 | 100 | 100 | 100 |
| 20 | 100 | 100 | 55 | 100 | 100 | 100 | 90 |
| 30 | 95 | 85 | 20 | 90 | 90 | 90 | 60 |
| 40 | 90 | 60 | 10 | 40 | 75 | 65 | 35 |
| 50 | 80 | 50 | 0 | 35 | 40 | 50 | 20 |
| 60 | 65 | 35 | | 30 | 20 | 40 | 15 |

All four of the talc samples coated with a carbon based polymer had lower melt fracture than the uncoated ABT® 2500 talc. Paraffin wax showed a melt fracture of 15 percent after one hour.

TABLE 11

RATE OF CONDITIONING
Die Pressure (psi)

| Time (min) | ABT® 2500 Talc | ABT-G | D.E. | Maleic- co-olefin | Maleic- styrene | Mineral Oil | Paraffin Wax |
|---|---|---|---|---|---|---|---|
| 0 | 3110 | 3100 | 3100 | 3100 | 3080 | 3110 | 3120 |
| 10 | 3100 | 3100 | 3040 | 3100 | 3080 | 3100 | 3100 |
| 20 | 3100 | 3100 | 2740 | 3100 | 3070 | 3080 | 3010 |
| 30 | 3100 | 2990 | 2640 | 3030 | 3030 | 3020 | 2860 |
| 40 | 3070 | 2830 | 2540 | 2820 | 2900 | 2840 | 2760 |
| 50 | 2970 | 2790 | 2480 | 2720 | 2750 | 2780 | 2710 |
| 60 | 2880 | 2760 | | 2700 | 2680 | 2750 | 2660 |

All of the carbon based polymers had higher die pressure reductions than the uncoated ABT® 2500 talc.

I claim:

1. A method of producing an antiblock agent consisting essentially of effectively surface treating inorganic minerals wherein the inorganic mineral is selected from the group consisting of talc, calcium carbonate, precipitated calcium carbonate, clay, and silica, with from about 0.1 percent to about 10 percent by weight antiblock agent of a functionalized siloxane, or a polyether, or a functionalized polyether, or a carbon based polymer to produce an antiblock agent that absorbs substantially reduced process aids in a polyolefin film.

2. The method of claim 1 wherein the inorganic mineral is selected from a group consisting of talc, calcium carbonate, precipitated calcium carbonate, clay, and silica.

3. The method of claim 1 wherein the inorganic mineral is talc.

4. The method of claim 1 wherein the functionalized siloxane is selected from the group consisting of functionalized alkyl polydimethylsilozane (carboxylate, amine, amide, thiol, sulfate, phosphate), Bis-(12-hydroxystearate) terminated polydimethylsiloxane, and Poly (Dimethylsiloxane)-Graf-Polyacrylates.

5. The method of claim 4 wherein the functionalized siloxane is Bis-(12-hydroxystearate) terminated polydimethylsiloxane.

6. The method of claim 1 wherein the silane is selected from the group consisting of octyltriethoxysilane, triamino functional silane, Bis-(gamma-trimethoxysilylpropyl) amine.

7. The method of claim 6 wherein the silane is Bis-(gamma-trimethoxysilylpropyl) amine.

8. The method of claim 4 wherein the functionalized siloxane has a structural formula of $[Si(CH_3)(R)-O-Si(CH_3)(R)-O]_n$ and wherein the molecular weight is from about 100 to about 100,000 a.m.u.

9. The method of claim 6 wherein the silane has a structural formula of $SiR_4$, where R is a functionalized alkyl group or functionalized alkoxy group.

10. The method of claim 3 wherein the talc is treated with from about 0.1 percent to about 10 percent, based on weight of inorganic mineral, of the functionalized siloxane.

11. The method of claim 3 wherein the talc is treated with from about 0.1 percent to about 2.0 percent, based on weight of inorganic mineral, of the functionalized siloxane.

12. The method of claim 3 wherein the talc is treated with from about 0.1 percent to about 10 percent, based on weight of inorganic mineral, of the silane.

13. The method of claim 3 wherein the talc is treated with from about 0.1 percent to about 2.0 percent, based on weight of inorganic mineral of the silane.

14. A functionalized siloxane antiblock and a silane antiblock produced according to the method of claim 1.

15. A method of producing plastic products comprising using antiblock products of claim 1 as a filler and polyolefin film additive.

16. The method of claim 1 wherein the polyether is selected from the group consisting of poly(ethylene glycol), poly (ethylene glycol) Bis-(carboxymethyl) ether, poly (ethylene glycol) dimethyl ether, poly (ethylene glycol-400) distearate, and the like, and the functionalized polyether is selected from the group consisting of polyethylene glycol and other functionalized polyethers such as, for example, alkyl carboxylate, alkyl amine, alkyl amide, alkyl sulfate, alkyl thiol, alkyl sulfonate, alkyl phosphate, alkyl phosphonate, wherein alkyl carboxylate is preferred.

17. The method of claim 1 wherein the polyether is polyethylene glycol (PEG) and the functionalized polyether is alkyl carboxy late functionalized PEG.

18. The method of claim 1 wherein the polyether and functionalized polyether have a general structural formula of $H-(OCHR(CH_2)_xCHR_1)_n-OH$ and wherein the molecular weight is from about 100 to about 100,000 a.m.u.

19. The method of claim 3 wherein the talc is treated with from about to about 0.1 percent to about 10 percent, based on weight of inorganic mineral, of the polyether or functionalized polyether.

20. The method of claim 3 wherein the talc is preferably treated with from about 0.1 percent to about 10 percent, based on weight of inorganic mineral, of the polyether or functionalized polyether.

21. A polyether antiblock product or a functionalized polyether antiblock product produced according to the method of claim 1.

22. A method of producing polyolefin film for use in packaging and film covering applications comprising using antiblock products of claim 21.

23. The method of claim 1 wherein the carbon based polymer is selected from the group consisting of functionalized polyolefins maleic acid/olefin copolymer, maleic acid/styrene copolymer.

24. The method of claim 23 wherein the carbon based polymer is maleic acid/styrene copolymer.

25. The method of claim 23 wherein the carbon based polymer has a general structural formula of

and wherein the molecular weight is from about 1,000 to about 10,000,000 a.m.u.

26. The method of claim 3 wherein the talc is treated with from about 0.1 percent to about 10 percent, based on weight of inorganic mineral, of the carbon based polymer.

27. The method of claim 3 wherein the talc is treated with from about 0.1 percent to about 2.0 percent, based on weight of inorganic mineral, of the carbon based polymer.

28. A functionalized carbon based polymer antiblock produced according to the method of claim 1.

29. A method of producing polyolefin.film for use in packaging and film covering applications comprising using antiblock products of claim 21.

30. A composition comprising an inorganic mineral core component selected from the group consisting of talc, calcium carbonate, precipitated calcium carbonate, clay, and silica and a surface treating component selected from the group consisting of functionalized siloxane, a silane, a polyether, a functionalized polyether, and a carbon based polymer to produce an antiblock agent that adsorbs substantially reduced process aids.

* * * * *

UNITED STATES PATENT AND TRADEMARK OFFICE
CERTIFICATE OF CORRECTION

PATENT NO. : 6,593,400 B1
DATED : July 15, 2003
INVENTOR(S) : Drummond

It is certified that error appears in the above-identified patent and that said Letters Patent is hereby corrected as shown below:

Column 14,
Line 1, Claim 20 should read as:
20. The method of claim 3 wherein the talc is treated with from about 0.1 percent to about 2 percent, based on weight of inorganic material, of the polyether or functionalized polyether.

Signed and Sealed this

Ninth Day of March, 2004

JON W. DUDAS
*Acting Director of the United States Patent and Trademark Office*